(12) United States Patent
Yajima

(10) Patent No.: US 12,436,206 B2
(45) Date of Patent: Oct. 7, 2025

(54) SENSOR OUTPUT COMPENSATION CIRCUIT

(71) Applicant: Murata Manufacturing Co., Ltd., Nagaokakyo (JP)

(72) Inventor: Aritsugu Yajima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 161 days.

(21) Appl. No.: 18/368,173

(22) Filed: Sep. 14, 2023

(65) Prior Publication Data

US 2024/0003991 A1    Jan. 4, 2024

Related U.S. Application Data

(63) Continuation of application No. PCT/JP2022/011139, filed on Mar. 11, 2022.

(30) Foreign Application Priority Data

Mar. 31, 2021  (JP) .................. 2021-061404
Apr. 7, 2021  (JP) .................. 2021-065128

(51) Int. Cl.
*G01R 33/00* (2006.01)
*G01R 33/09* (2006.01)

(52) U.S. Cl.
CPC ..... *G01R 33/0082* (2013.01); *G01R 33/0029* (2013.01); *G01R 33/098* (2013.01)

(58) Field of Classification Search
CPC ............ G01R 33/0082; G01R 33/0029; G01R 33/098; G01R 15/207
(Continued)

(56) References Cited

U.S. PATENT DOCUMENTS 4,658,855 A    4/1987 Doyle
5,933,003 A    8/1999 Hebing et al.
(Continued)

FOREIGN PATENT DOCUMENTS

JP    H02236184 A    9/1990
JP    H08233867 A    9/1996
(Continued)

OTHER PUBLICATIONS

Translation of JP 2005009440 (Year: 2005).*
(Continued)

*Primary Examiner* — Christopher P Mcandrew
(74) *Attorney, Agent, or Firm* — Keating & Bennett, LLP

(57) ABSTRACT

A sensor output compensation circuit includes a differential amplifier circuit to amplify a sensor output that is outputted as a differential voltage between outputs of first and second composite arithmetic circuits, based on predetermined detection voltages measured in detection signal output terminals of two TMR sensors. The two TMR sensors are located at relative positions between which the influence of a residual magnetic field in the TMR sensors is canceled out, and a voltage is applied thereto in opposite directions. The first composite arithmetic circuit adds the detection voltages that are measured in the detection signal output terminals of the two TMR sensors in a first phase. The second composite arithmetic circuit adds the detection voltages that are measured in the detection signal output terminals of the two TMR sensors in a second phase.

17 Claims, 12 Drawing Sheets

(58) Field of Classification Search
USPC ......................................................... 324/224
See application file for complete search history.

(56) References Cited

U.S. PATENT DOCUMENTS

| | | | |
|---|---|---|---|
| 2010/0052664 A1 | 3/2010 | Nishizawa et al. | |
| 2013/0314075 A1* | 11/2013 | Ausserlechner | G01R 33/07 73/1.01 |
| 2018/0188294 A1 | 7/2018 | Kawanami | |
| 2021/0018576 A1* | 1/2021 | Latham | G01R 15/207 |
| 2021/0247466 A1* | 8/2021 | Hammerschmidt | G01B 7/30 |

FOREIGN PATENT DOCUMENTS

| | | |
|---|---|---|
| JP | H1038611 A | 2/1998 |
| JP | 10506193 A | 6/1998 |
| JP | 11194160 A | 7/1999 |
| JP | 2006194837 A | 7/2006 |
| JP | 2009047478 A | 3/2009 |
| JP | 2012047630 A | 3/2012 |
| JP | 2015154349 A | 8/2015 |
| JP | 2017078646 A | 4/2017 |
| JP | 2017227450 A | 12/2017 |
| WO | 2008130002 A1 | 10/2008 |
| WO | 2017061206 A1 | 4/2017 |
| WO | 2019069499 A1 | 4/2019 |
| WO | 2020188513 A1 | 9/2020 |

OTHER PUBLICATIONS

International Search Report in PCT/JP2022/011139, mailed May 17, 2022, 3 pages.
Written Opinion in PCT/JP2022/011139, mailed May 17, 2022, 4 pages.

* cited by examiner $$y = -6.469\text{E-}07x^3 - 1.512\text{E-}06x^2 + 2.175\text{E-}02x + 4.306\text{E-}03$$

SENSOR OUTPUT COMPENSATION CIRCUIT

CROSS REFERENCE TO RELATED APPLICATIONS

This application claims the benefit of priority to Japanese Patent Application No. 2021-065128 filed on Apr. 7, 2021 and Japanese Patent Application No. 2021-061404 filed on Mar. 31, 2021 and is a Continuation Application of PCT Application No. PCT/JP2022/011139 filed on Mar. 11, 2022. The entire contents of each application are hereby incorporated herein by reference.

BACKGROUND OF THE INVENTION

1. Field of the Invention

The present invention relates to a sensor output compensation circuit that adjusts the output of a sensor that includes a sensor element connected by bridge connection.

2. Description of the Related Art

An existing sensor output compensation circuit relates to, for example, a magnetoresistive element amplifier circuit disclosed in Japanese Unexamined Patent Application Publication No. 11-194160.

The magnetoresistive element amplifier circuit includes a magnetoresistive element in which four strong magnetoresistive element patterns are connected by bridge connection as a sensor and performs the differential amplification of the output voltage of the magnetoresistive element by connecting a differential amplifier circuit to two output terminals of the magnetoresistive element. The differential amplifier circuit includes an offset adjustment circuit that makes the midpoint potential of the amplified output voltage variable and that sets the midpoint potential to predetermined potential by using a variable resistor. At a subsequent position, a temperature compensation circuit that compensates a variation in the amplitude of the output voltage due to a change in temperature is provided.

However, the existing sensor output compensation circuit disclosed in Japanese Unexamined Patent Application Publication No. 11-194160 can compensate only for variations in the offset of the sensor and the amplitude of the output voltage. In some sensors that detect physical quantity, a residual magnetic field is accumulated in the sensors due to the influence of an applied magnetic field. As for such sensors, the influence of the residual magnetic field in the sensors cannot be removed from the sensor output by using the existing sensor output compensation circuit described above, and the physical quantity cannot be accurately detected.

SUMMARY OF THE INVENTION

Preferred embodiments of the present invention, provide sensor output compensation circuits that each remove an influence of a residual magnetic field in sensors from a sensor output and are each able to accurately detect a physical quantity.

A preferred embodiment of the present invention provides a sensor output compensation circuit including a differential amplifier circuit to amplify a sensor output outputted based on a predetermined detection voltage measured in detection signal output terminals of two sensors including respective sensor elements with a resistance value that is variable depending on a detected physical quantity and that are connected by a bridge connection, the two sensors being located at relative positions between which an influence of a residual magnetic field is canceled out, the sensor output depending on the physical quantity detected by the sensors, and a bias circuit to apply a voltage to two power terminals of one of the two sensors in a direction opposite to a direction in which a voltage is applied to two power terminals of another of the two sensors.

With this structure, an influence of the residual magnetic field in the sensors is canceled without improving the sensors themselves such that the two sensors are located at the relative positions between which the influence of the residual magnetic field is canceled out, and the bias circuit applies the voltage to the two power terminals of the sensors in opposite directions. The sensor output depending on the physical quantity that is detected by the sensors is outputted based on the predetermined detection voltage measured in the detection signal output terminals of the two sensors and is amplified by the differential amplifier circuit. For this reason, the influence of the residual magnetic field in the sensors is removed from the sensor output, and the sensor output compensation circuit enables the physical quantity to be accurately detected.

For this reason, preferred embodiments of the present invention provide sensor output compensation circuits each able to remove an influence of a residual magnetic field in sensors from a sensor output and each able to accurately detect a physical quantity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to the drawings.

Figure 1:
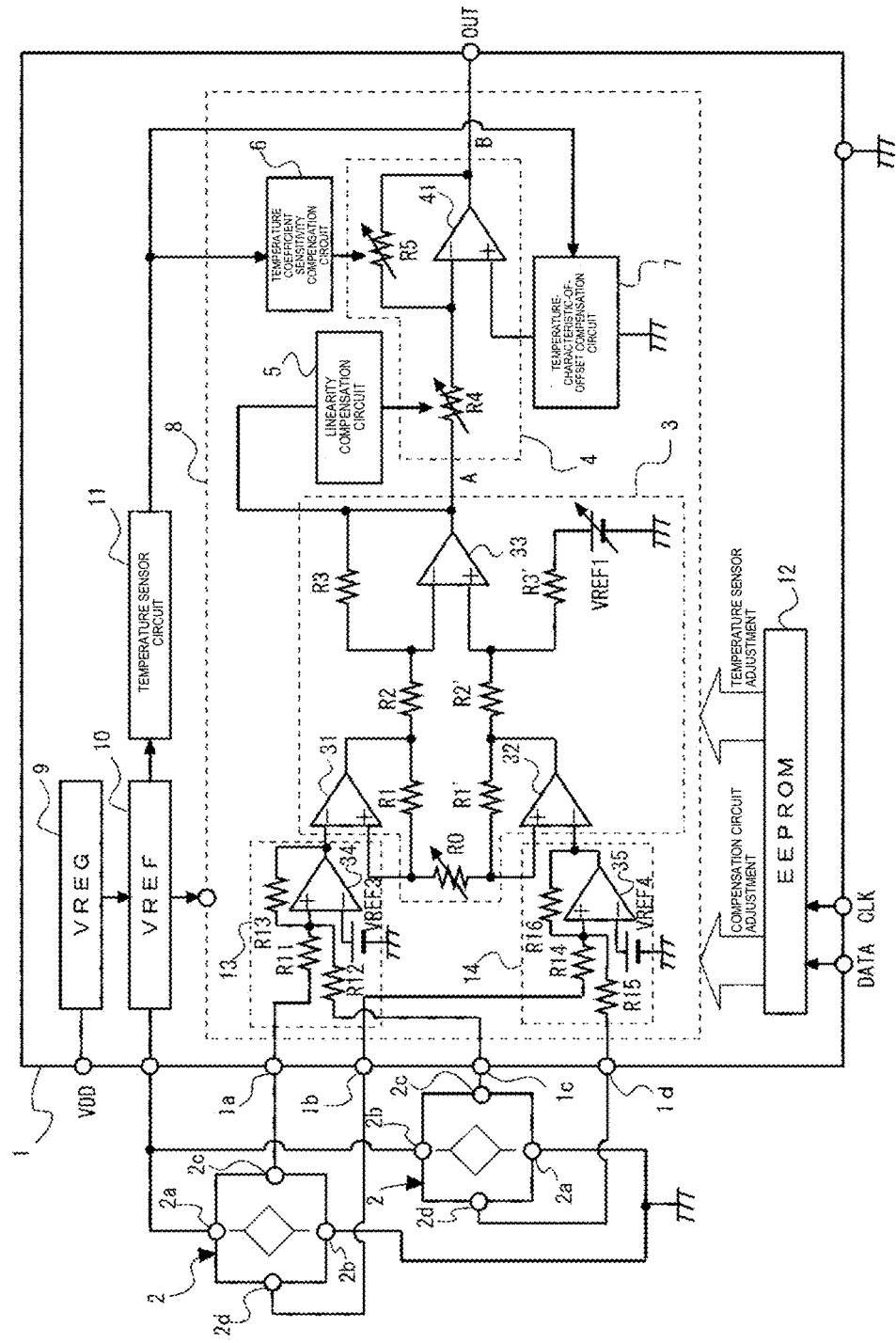
FIG. 1 is a circuit diagram illustrating a configuration of an entire sensor output compensation circuit according to a first preferred embodiment of the present invention.

FIG. 1 is a circuit diagram illustrating a configuration an entire sensor output compensation circuit according to a first preferred embodiment of the present invention.

The sensor output compensation circuit receives the outputs of two TMR (Tunneling Magneto-Resistive) sensors 2, adjusts a sensor output in various ways, and is provided as an IC corresponding to a sensor output compensation IC 1. As for the TMR sensors 2, TMR elements the resistance value of which changes depending on a magnetic field that is a physical quantity to be detected are connected by bridge connection, a predetermined voltage is applied to two power terminals 2a and 2b for operation. The magnetic field that is detected by the TMR sensors 2 is measured as a voltage difference between two detection signal output terminals 2c and 2d. The voltage difference that is measured in one of the TMR sensors 2 is applied to signal input terminals 1a and 1b of the sensor output compensation IC 1. The voltage difference that is measured in the other TMR sensor 2 is applied to signal input terminals 1c and 1d of the sensor output compensation IC 1. The TMR sensors 2 are used, for example, to monitor an electric current that is supplied to a motor of a hybrid vehicle.

Figure 10:
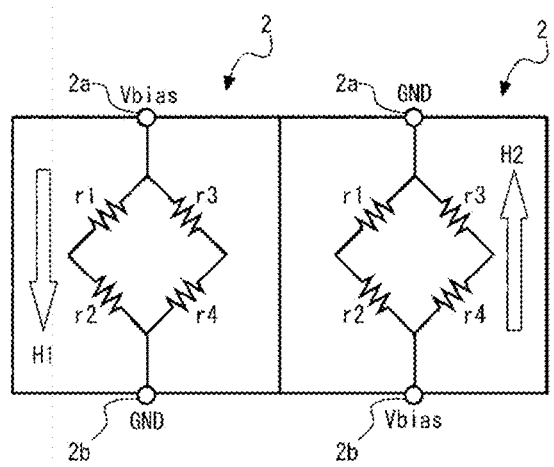
FIG. 10 illustrates the layout of two TMR sensors in the sensor output compensation circuit illustrated in FIG. 1.

As for the TMR sensors 2, as the applied magnetic field becomes stronger, a residual magnetic field is accumulated in the sensors, and the detected magnetic field has hysteresis due to the influence of the residual magnetic field. For this reason, according to the present preferred embodiment, the two TMR sensors 2 are included, and as illustrated in FIG. 10, the TMR sensors 2 are arranged at relative positions between which the influence of the residual magnetic field in the TMR sensors 2 is canceled out. That is, a bias voltage Vbias is applied to the power terminal 2a of one of the TMR sensors 2 by using a reference voltage circuit 10 that is included in a bias circuit and that will be described later, and the power terminal 2b is grounded at GND. The direction of an electric current that flows depending on the detected magnetic field through magnetoresistive element patterns r1, r2, r3, and r4 that are connected by bridge connection is changed from an upward direction into a downward direction H1 in FIG. 10. As for the other TMR sensor 2, the power terminal 2a is grounded at GND, and the bias voltage Vbias is applied to the power terminal 2b by using the reference voltage circuit 10. The direction of an electric current that flows depending on the detected magnetic field through magnetoresistive element patterns r1, r2, r3, and r4 that are connected by bridge connection is changed from the downward direction into the upward direction, that is, a direction H2 opposite the direction H1 by about 180°. In this way, the directions of the electric currents that flow through the TMR sensors 2 are opposite to each other, and consequently, the hysteresis characteristics of the TMR sensors 2 can be canceled.

A differential amplifier circuit 3 amplifiers the sensor output to be outputted based on predetermined detection voltages that are measured in the detection signal output terminals 2c and 2d of the two TMR sensors 2 and that depend on the magnetic field detected by the TMR sensors 2. According to the present preferred embodiment, the differential amplifier circuit 3 amplifies, as the sensor output, a differential voltage between the output of a first composite arithmetic circuit 13 and the output of a second composite arithmetic circuit 14.

The first composite arithmetic circuit 13 includes an adder circuit in which resistors R11, R12, and R13 are connected to an operational amplifier 34. A reference voltage VREF3 is applied to an inverting input terminal of the operational amplifier 34 from a regulator circuit 10, and the first composite arithmetic circuit 13 adds detection voltages that are measured in the detection signal output terminals 2c of the two TMR sensors 2 in a phase. The second composite arithmetic circuit 14 includes an adder circuit in which resistors R14, R15, and R16 are connected to an operational amplifier 35, and a reference voltage VREF4 is applied to an inverting input terminal of the operational amplifier 35 from the regulator circuit 10. The second composite arithmetic circuit 14 adds detection voltages that are measured in the detection signal output terminals 2d of the two TMR sensors 2 in another phase.

In the description according to the present preferred embodiment, the first composite arithmetic circuit 13 and the second composite arithmetic circuit 14 include the respective adder circuits but may include, for example, respective averaging circuits that average the detection voltages that are measured in the detection signal output terminals 2c in a phase and the detection voltages that are measured in the detection signal output terminals 2d in another phase. The gain Av of the operational amplifiers 34 and 35 of the first composite arithmetic circuit 13 and the second composite arithmetic circuit 14 is preferably, for example, about 1 or less (Av≤1) such that the offset voltage of the TMR sensors 2 is not uselessly amplified because the differential amplifier circuit 3 at a subsequent position includes an instrumentation amplifier, and a CMRR (a common-mode rejection ratio), for example, is good.

Various kinds of compensation provided by the sensor output compensation IC 1 include, for example, linearity compensation for the sensor output, sensitivity compensation, temperature coefficient sensitivity (TCS) compensation, offset compensation, and temperature-characteristic-of-offset (TCO) compensation. Compensation concerning variations in these kinds of compensation due to the TMR sensors 2 is also included.

The linearity compensation is compensation to remove a nonlinearity component from the sensor output and to guarantee the linearity of the sensor output. The offset compensation is compensation to cancel out the offset voltage that is measured in the two detection signal output terminals 2c and 2d when the TMR sensors 2 detect no magnetic field. The temperature-characteristic-of-offset compensation is compensation to cancel out a temperature variation in the offset voltage. The sensitivity compensation is compensation to cancel out a variation in the sensitivity of the two TMR sensors 2 due to the TMR sensors 2. The sensitivity of the two TMR sensors 2 is obtained by dividing, by a rated magnetic field, an output span voltage that is obtained by subtracting the offset voltage from the rated output voltage of the sensor output compensation IC 1 and means a change in output voltage per unit magnetic field. The temperature coefficient sensitivity compensation is compensation to cancel out a temperature variation in temperature coefficient sensitivity that represents what degree the output span voltage changes at maximum at compensation temperature.

The sensor output compensation IC 1 includes the differential amplifier circuit 3 that includes the instrumentation amplifier and a compensation amplifier circuit 4 that adjusts the output of the differential amplifier circuit 3. The differential amplifier circuit 3 includes operational amplifiers 31 and 32 that amplify the output of the first composite arithmetic circuit 13 and the output of the second composite arithmetic circuit 14 and an operational amplifier 33 that performs the differential amplification of the amplified outputs. The differential voltage between the output of the first composite arithmetic circuit 13 and the output of the second composite arithmetic circuit 14 is dealt with as a substantial sensor output. The differential amplifier circuit 3 outputs an output A that is obtained by amplifying the sensor output with an amplification factor α expressed as the following expression (1):

$$\alpha=(R3/R2)\times\{1+(2\times R1)/R0\}, \quad (1)$$

where R1=R1', R2=R2', and R3=R3' are satisfied, R0 is a variable resistor, and R0, R1, R2, R3, R1', R2', and R3' are resistance values and resistors that are connected to the operational amplifiers 31 to 33 as illustrated.

The sensitivity of the sensor output is adjusted in a manner in which the variable resistor R0 is made variable, and a variation therein due to the TMR sensors 2 is compensated for. A variable voltage source VREF1 is connected to a non-inverting input terminal of the operational amplifier 33 with the resistor R3' interposed therebetween. The offset voltage of the sensor output is adjusted in a manner in which the output voltage of the variable voltage source VREF1 is made variable and is adjusted such that an output voltage VOUT that is measured in an output terminal OUT of the sensor output compensation IC 1 is zero or approximately zero when the TMR sensors 2 detect no magnetic field.

The compensation amplifier circuit 4 includes an operational amplifier 41 to which a variable resistor R4 and a variable resistor R5 are connected and outputs, as the output voltage VOUT, an output B that is obtained by the inverting amplification of the output A of the differential amplifier circuit 3 to the output terminal OUT of the sensor output compensation IC 1. As a result, the sensor output is amplified with an amplification factor β expressed as the following expression (2):

$$\beta=\alpha\times(R5/R4)=(R3/R2)\times\{1+(2\times R1)/R0\}\times(R5/R4) \quad (2)$$

An amplification factor (R5/R4) of the compensation amplifier circuit 4 changes when the resistance value of the variable resistor R4 or R5 to be connected is changed. According to the present preferred embodiment, the resistance values of the variable resistors R4 and R5 are made variable in a manner in which connections between multiple resistors, not illustrated, are switched by multiple switches, not illustrated, and the combined resistance value of the multiple resistors is changed.

The sensor output compensation IC 1 according to the present preferred embodiment includes a linearity compensation circuit 5 that adjusts the linearity of the sensor output, a temperature coefficient sensitivity compensation circuit 6 that adjusts the temperature coefficient sensitivity of the sensor output, and a temperature-characteristic-of-offset compensation circuit 7 that adjusts the temperature characteristics of the offset voltage of the sensor output. The differential amplifier circuit 3, the compensation amplifier circuit 4, the linearity compensation circuit 5, the temperature coefficient sensitivity compensation circuit 6, the temperature-characteristic-of-offset compensation circuit 7, the first composite arithmetic circuit 13, and the second composite arithmetic circuit 14 are included in a compensation block 8 of the sensor output compensation IC 1.

The sensor output compensation IC 1 also includes the regulator circuit (VREG) 9, the reference voltage circuit (VREF) 10, and a temperature sensor circuit 11. The regulator circuit 9 generates a standard voltage from a voltage that is applied to a power terminal VDD. The reference voltage circuit 10 generates reference voltages that are used in, for example, the temperature coefficient sensitivity compensation circuit 6 and the temperature-characteristic-of-offset compensation circuit 7 and the bias voltage Vbias that is applied to the TMR sensors 2 as the bias circuit from the standard voltage that is generated by the regulator circuit 9. The temperature sensor circuit 11 detects the ambient temperature using a diode and outputs, as a voltage, the detected ambient temperature to the temperature coefficient sensitivity compensation circuit 6 and the temperature-characteristic-of-offset compensation circuit 7. The TMR sensors 2 and the sensor output compensation IC 1 are adjacent to each other, and accordingly, the ambient temperature that is detected by the temperature sensor circuit 11 is detected as the ambient temperature of the TMR sensors 2.

The sensor output compensation IC 1 also includes an EEPROM 12 that enables a user to rewrite a stored content. Setting data is written on the EEPROM 12 from a data terminal DATA by the user. Depending on the setting data, the settings of compensation operations using the various compensation circuits in the compensation block 8 are adjusted, and settings of temperature detection using the temperature sensor circuit 11 are adjusted.

According to the present preferred embodiment, the compensation is provided by the linearity compensation circuit 5 and the temperature coefficient sensitivity compensation circuit 6 in a manner in which the amplification factor (R5/R4) of the compensation amplifier circuit 4 is made variable as described later. The amplification factor (R5/R4) is made variable in a manner in which connection states between the multiple resistors that are included in the variable resistors R4 and R5 are switched by the multiple switches depending on the setting data that is written on the EEPROM 12. The compensation is provided by the temperature-characteristic-of-offset compensation circuit 7 in a manner in which connection states between switches 75 and 76 (see FIG. 8) described later are switched depending on the setting data that is written on the EEPROM 12. The temperature sensor circuit 11 is adjusted depending on the setting data that is written on the EEPROM 12 such that a voltage of 1 [V] is outputted when the ambient temperature is, for example, about 25° C.

Figure 2:
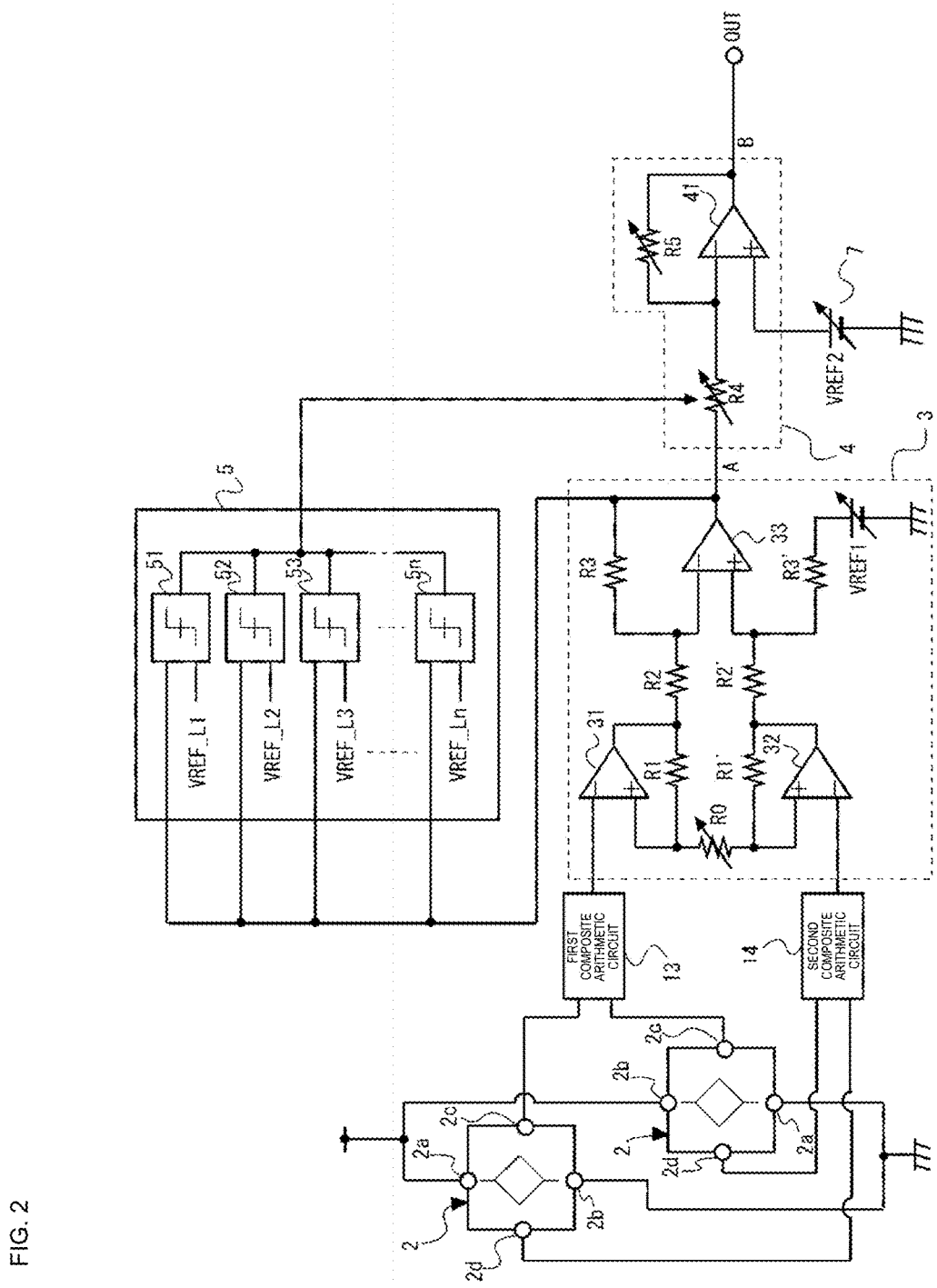
FIG. 2 is a circuit diagram for describing the function of a linearity compensation circuit in the sensor output compensation circuit illustrated in FIG. 1.

FIG. 2 is a circuit diagram for describing the function of the linearity compensation circuit 5 in the sensor output compensation IC 1 illustrated in FIG. 1. In FIG. 2, the same or corresponding components as those in FIG. 1 are designated by the same reference signs, and the description thereof is omitted.

The linearity compensation circuit 5 includes multiple comparators 51, 52, 53, . . . , and 5n. The output voltage of the differential amplifier circuit 3 is applied to first input terminals of the comparators 51, 52, 53, . . . , and 5n, and predetermined reference voltages VREF_L1 VREF_L2, VREF_L3, . . . , and VREF_Ln that are outputted from the reference voltage circuit 10 are applied to second input terminals. The reference voltages VREF_L1, VREF_L2, VREF_L3, . . . , and VREF_Ln correspond to sensor outputs depending on the magnetic field that causes predetermined distortion that is created in the sensor output and that has nonlinearity and are set in advance by using the setting data that is written on the EEPROM 12.

The linearity compensation circuit 5 makes the amplification factor (R5/R4) of the compensation amplifier circuit 4 variable into an amplification factor to cancel the distortion in a manner in which the multiple switches that are included in the variable resistor R4 are switched, and the resistance value of the variable resistor R4 is made variable, depending on the results of a comparison between the multiple reference voltages and the output voltage of the differential amplifier circuit 3.

In the description herein, the amplification factor (R5/R4) of the compensation amplifier circuit 4 is made variable in a manner in which the multiple switches that are included in the variable resistor R4 are switched, and the resistance value of the variable resistor R4 is made variable. However, the amplification factor (R5/R4) of the compensation amplifier circuit 4 may be made variable in a manner in which the multiple switches that are included in the variable resistor R5 are switched, and the resistance value of the variable resistor R5 is made variable.

Figure 3A:
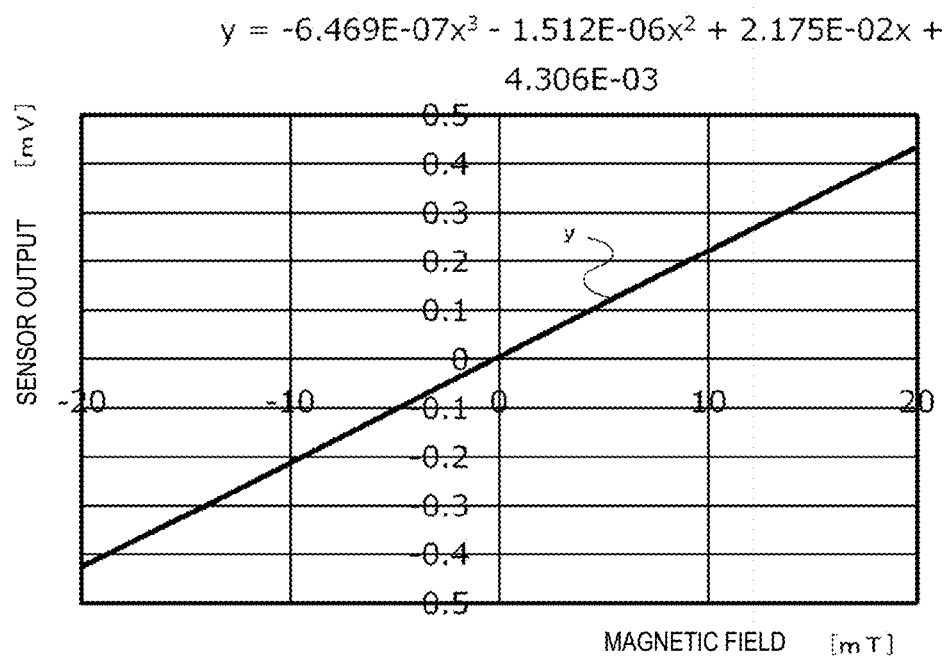
FIG. 3A is a graph illustrating a change in the sensor output with respect to a magnetic field.

FIG. 3A is a graph illustrating an example of a relationship between the magnetic field that is applied to the two TMR sensors 2 and the sensor output that is measured as the differential voltage between the output of the first composite arithmetic circuit 13 and the output of the second composite arithmetic circuit 14 when the magnetic field is applied to the two TMR sensors 2. The horizontal axis of the graph represents the magnetic field [mT] that is applied to the two TMR sensors 2, and the vertical axis represents the sensor output [mV]. A characteristic line y represents a change in the sensor output with respect to the magnetic field when the ambient temperature of the sensor output compensation IC 1 is 25° C. and represents the linearity characteristics of the sensor output. The characteristic line y is expressed as the following polynomial expression (3):

$$y = -6.469e^{-0.7}x^3 - 1.512e^{-0.6}x^2 + 2.175e^{-0.2}x + 4.306e^{-0.3}, \quad (3)$$

where a magnetic field x is a variable.

Figure 3B:
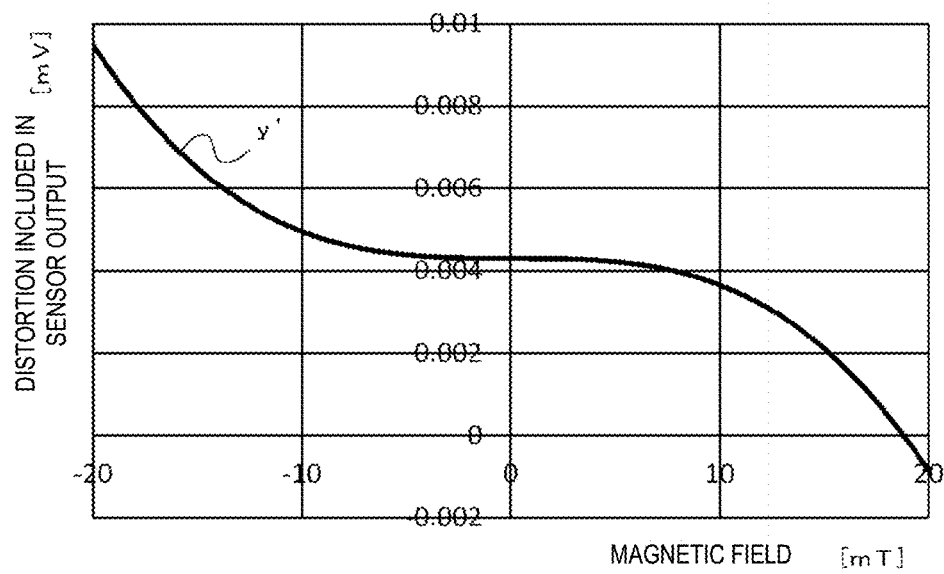
FIG. 3B is a graph illustrating the distortion of the sensor output that has nonlinearity.

In the graph, the characteristic line y appears to be linear but includes nonlinear components expressed by a first term and a second term in a right-hand side of the expression (3). A graph illustrated in FIG. 3B represents a relationship between the magnetic field and the sensor output except for a linear component in a third term in the right-hand side. The horizontal axis of the graph represents the magnetic field [mT] that is applied to the two TMR sensors 2, and the vertical axis represents the sensor output [mV] except for the linear component. A characteristic line y' represents the distortion of the sensor output that has nonlinearity. The distortion affects the precision of detection of the magnetic field by using the TMR sensors 2, and accordingly, the linearity compensation circuit 5 compensates the distortion.

In the graph, the distortion is seen in a magnetic field region of about +8 [mT] or more and a magnetic field region of about −8 [mT] or less. Accordingly, when the sensor output is obtained with respect to a predetermined magnetic field in each magnetic field region, the linearity compensation circuit 5 cancels the distortion by making the amplification factor of the compensation amplifier circuit 4 variable.

Figure 4A:
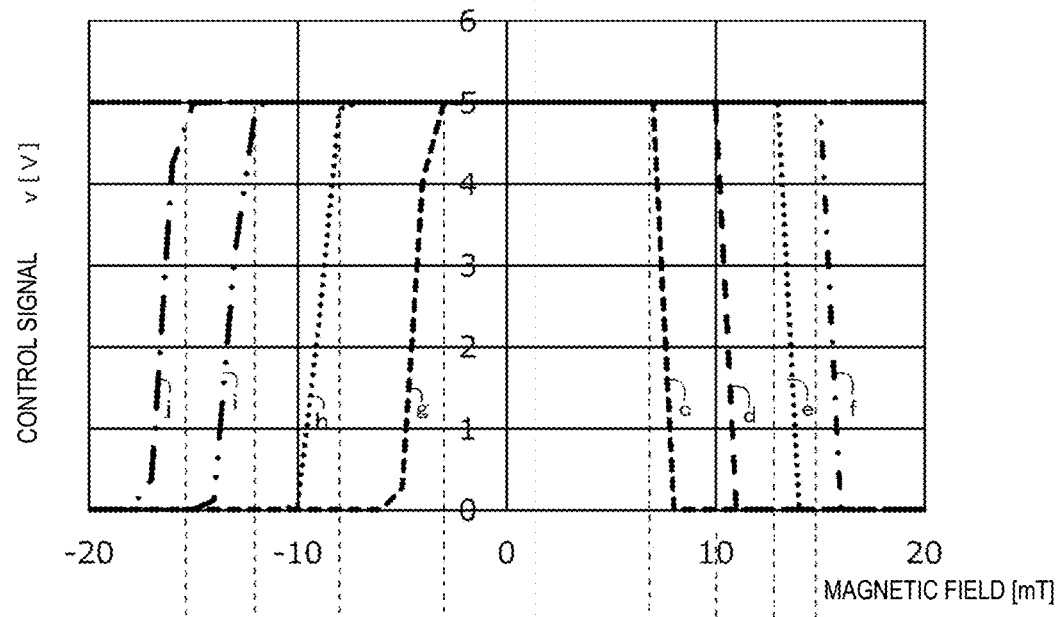
FIG. 4A is a graph illustrating a control signal that is outputted from the linearity compensation circuit to change the resistance value of a variable resistor R4.

FIG. 4A is a graph illustrating an example of a control signal v that is outputted from the linearity compensation circuit 5 to the switches of the variable resistor R4. The horizontal axis of the graph represents the magnetic field [mT] that is applied to the two TMR sensors 2, and the vertical axis represents the voltage [V] of the control signal v. Characteristic lines c, d, e, and f represent control signals v1, v2, v3, and v4 for correcting the distortion of a sensor output of about +8 [mT] or more in a positive magnetic field illustrated in FIG. 3B. Characteristic lines g, h, i, and j represent control signals v5, v6, v7, and v8 to correct the distortion of a sensor output of about −8 [mT] or less in a negative magnetic field. The control signals v1 to v8 change between a high level of about +5 [V] and a low level of about 0 [V]. For example, a change into the low level results in close control of switches sw1 to sw8.

In the graph, as for the distortion of the sensor output in a magnetic field region of about +8 [mT] or more, when the magnetic field is about +7 [mT], the level of the control signal v1 that is represented by the characteristic line c is reduced, and the close control of the switch sw1 is consequently provided. Consequently, the resistance value of the variable resistor R4 is made variable, and the amplification factor of the compensation amplifier circuit 4 is changed into an amplification factor to cancel the distortion in the magnetic field. When the magnetic field is about +10 [mT], the level of the control signal v2 that is represented by the characteristic line d is reduced, and the close control of the switch sw2 is consequently provided, or when the magnetic field is about +13 [mT], the level of the control signal v3 that is represented by the characteristic line e is reduced, and the close control of the switch sw3 is consequently provided, or when the magnetic field is about +15 [mT], the level of the control signal v4 that is represented by the characteristic line f is reduced, and the close control of the switch sw4 is consequently provided. Consequently, the resistance value of the variable resistor R4 is made variable, and the amplification factor of the compensation amplifier circuit 4 is changed into the amplification factor to cancel the distortion in the magnetic field.

Similarly, as for the distortion of the sensor output in a magnetic field region of about −8 [mT] or less, the close control of the switches sw5 to sw8 is provided by using the control signals v5 to v8 that are represented by the characteristic lines g to j, and consequently, the resistance value of the variable resistor R4 is made variable, and the amplification factor of the compensation amplifier circuit 4 is changed into the amplification factor to cancel the distortion in the magnetic field.

Figure 4B:
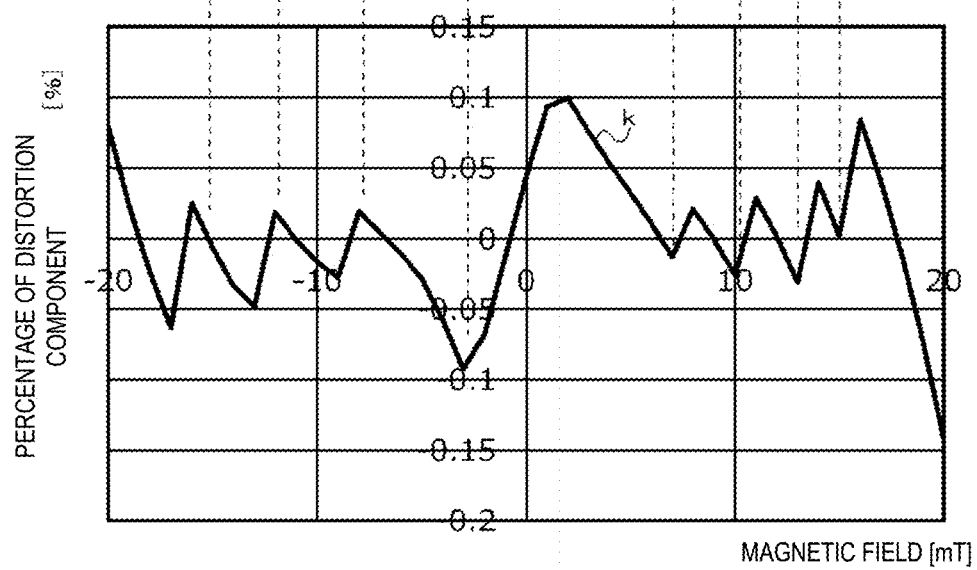
FIG. 4B is a graph illustrating the distortion of the sensor output that is compensated by the linearity compensation circuit.

FIG. 4B is a graph illustrating the distortion of the sensor output after the nonlinearity of the sensor output is compensated for by controlling the resistance value of the variable resistor R4 by using the linearity compensation circuit 5. The horizontal axis of the graph represents the magnetic field [mT] that is applied to the TMR sensors 2, and the vertical axis represents the percentage [%] of a distortion component that is included in the output voltage VOUT that is outputted to the output terminal out of the sensor output compensation IC 1. A characteristic line k represents variation characteristics of the distortion component that is included in the output voltage VOUT with respect to a change in the magnetic field.

The distortion of the sensor output in a magnetic field region of about +8 [mT] or more decreases in the right-hand direction as the magnetic field increases as illustrated in FIG. 3B. However, it is understood from the characteristic line k that when the levels of the control signals v1, v2, v3, and v4 are sequentially lowered when the magnetic field is about +7 [mT], about +10 [mT], about +13 [mT], or about +15 [mT], the amplification factor of the compensation amplifier circuit 4 is increased, the percentage of the distortion component consequently increases in the right-hand direction, and a decrease in the distortion illustrated in FIG. 3B is canceled.

The distortion of the sensor output in a magnetic field region of about −8 [mT] or less increases in the left-hand direction as the magnetic field decreases as illustrated in FIG. 3B. However, it is similarly understood from the characteristic line k that when the levels of the control signals v5 to v8 are sequentially reduced as the magnetic field decreases, the amplification factor of the compensation amplifier circuit 4 is decreased, the percentage of the distortion component consequently decreases in the left-hand direction, and an increase in the distortion illustrated in FIG. 3B is canceled.

The percentage of the distortion component increases in the right-hand direction in a positive magnetic field region and temporarily decreases in the right-hand direction due to a decrease in the original distortion illustrated in FIG. 3B, and decreases in the left-hand direction in a negative magnetic field region and temporarily increases in the left-hand direction due to an increase in the original distortion illustrated in FIG. 3B. Accordingly, as illustrated in FIG. 4B, the characteristic line k varies upward and downward in a zigzag manner, but the range of the variation in the distortion component is reduced to about ±0.1 [%] or less, and the linearity of the sensor output is guaranteed.

As for the sensor output compensation IC 1 according to the present preferred embodiment as described above, the amplification factor of the compensation amplifier circuit 4 is made variable in a manner in which connections between the multiple resistors that are connected to the compensation amplifier circuit 4 as the variable resistor R4 are switched under control of the multiple switches of the linearity compensation circuit 5, and the combined resistance value of the multiple resistors is changed. The switching operation of the switches is performed when the output voltage of the differential amplifier circuit 3 is compared with the predetermined multiple reference voltages VREF_L1, VREF_L2, VREF_L3, . . . , and VREF_Ln and becomes a voltage corresponding to the sensor output depending on the magnetic field that causes the predetermined distortion. The switching operation of the switches adjusts the amplification factor of the compensation amplifier circuit 4 to the amplification factor to cancel the predetermined distortion in the output of the differential amplifier circuit 3 depending on the output voltage of the differential amplifier circuit 3, and the linearity of the sensor output is guaranteed.

That is, as for the sensor output compensation IC 1 according to the present preferred embodiment, the distortion that has nonlinearity in the sensor output as the magnetic field changes is compensated for in a manner in which the amplification factor of the compensation amplifier circuit 4 that adjusts the output of the differential amplifier circuit 3 is made variable into the amplification factor to cancel the distortion by using the linearity compensation circuit 5. Accordingly, the distortion of the sensor output can be compensated for without feedback of the sensor output unlike an existing nonlinearity compensation circuit (see Japanese Unexamined Patent Application Publication No. 2003-248017). For this reason, a circuit reaction speed increases, and the nonlinearity compensation of the sensor output is provided at a high speed. The sensor output compensation circuit needs no adder circuits unlike existing cases, and accordingly, the circuit scale of the sensor output compensation IC 1 can be reduced.

Figure 5:
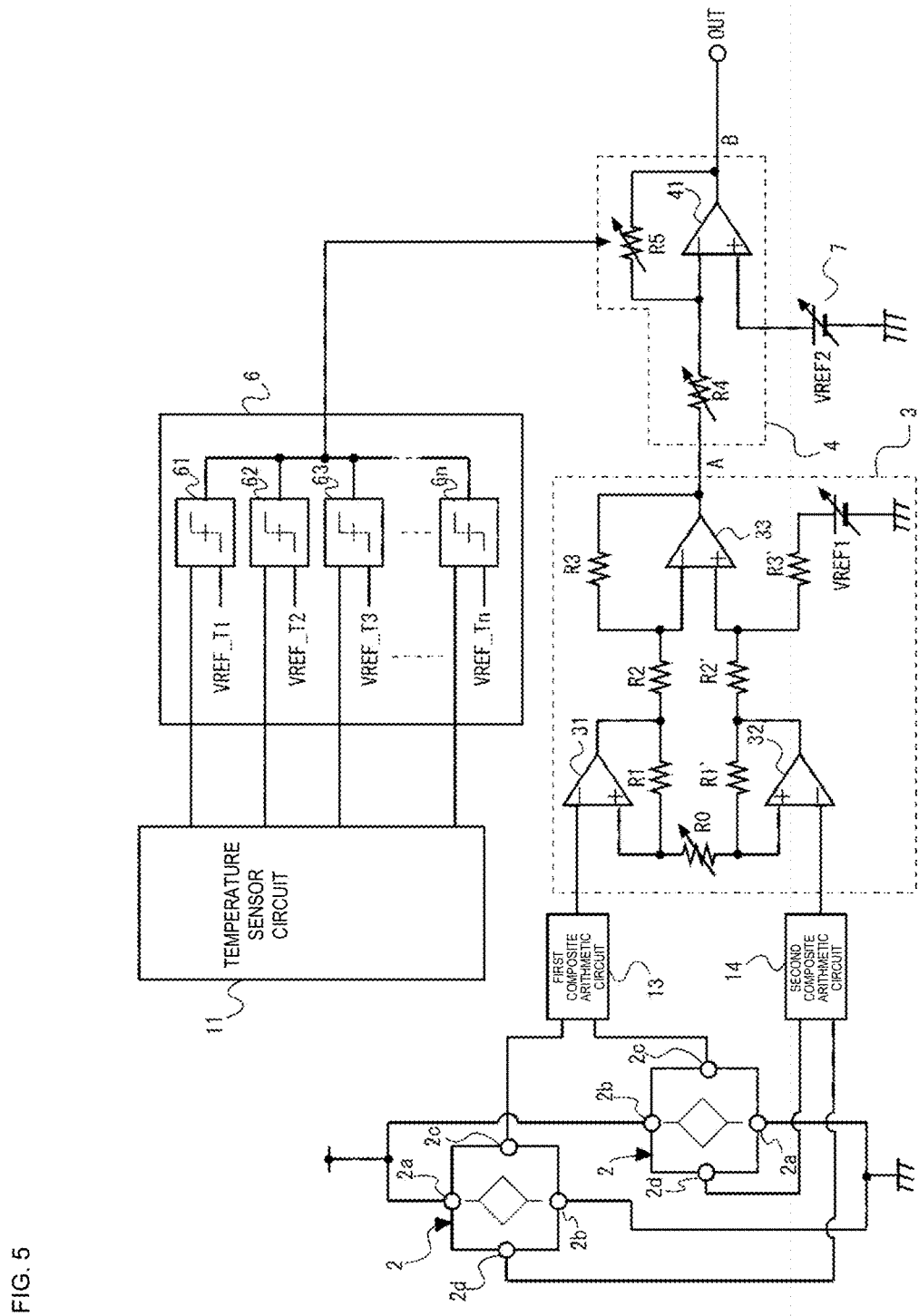
FIG. 5 is a circuit diagram for describing the function of a temperature coefficient sensitivity compensation circuit in the sensor output compensation circuit illustrated in FIG. 1.

FIG. 5 is a circuit diagram for describing the function of the temperature coefficient sensitivity compensation circuit 6 in the sensor output compensation IC 1 illustrated in FIG. 1. In FIG. 5, the same or corresponding components as those in FIG. 1 are designated by the same reference signs, and the description thereof is omitted.

The temperature coefficient sensitivity compensation circuit 6 includes multiple comparators 61, 62, 63, . . . , and 6n. The ambient temperature that is detected by the temperature sensor circuit 11 as a voltage is inputted into first input terminals of the comparators 61, 62, 63, . . . , and 6n, and predetermined reference voltages VREF_T1, VREF_T2, VREF_T3, . . . , and VREF_Tn that are outputted from the reference voltage circuit 10 are applied to second input terminals. The reference voltages VREF_T1, VREF_T2, VREF_T3, . . . , and VREF_Tn correspond to voltages depending on the ambient temperature that causes a predetermined variation in the sensitivity of the sensor output and are set in advance by using the setting data that is written on the EEPROM 12.

The temperature coefficient sensitivity compensation circuit 6 makes the amplification factor (R5/R4) of the compensation amplifier circuit 4 variable into an amplification factor to cancel the variation in the sensitivity of the sensor output as the ambient temperature changes in a manner in which the multiple switches that are included in the variable resistor R5 are switched, and the resistance value of the variable resistor R5 is made variable, depending on the result of comparison between the multiple reference voltages and the ambient temperature that is detected by the temperature sensor circuit 11 as a voltage.

In the description herein, the amplification factor (R5/R4) of the compensation amplifier circuit 4 is made variable in a manner in which the multiple switches that are included in the variable resistor R5 are switched, and the resistance value of the variable resistor R5 is made variable. However, for example, the amplification factor (R5/R4) of the compensation amplifier circuit 4 may be made variable in a manner in which the multiple switches that are included in the variable resistor R4 are switched, and the resistance value of the variable resistor R4 is made variable.

Figure 6A:
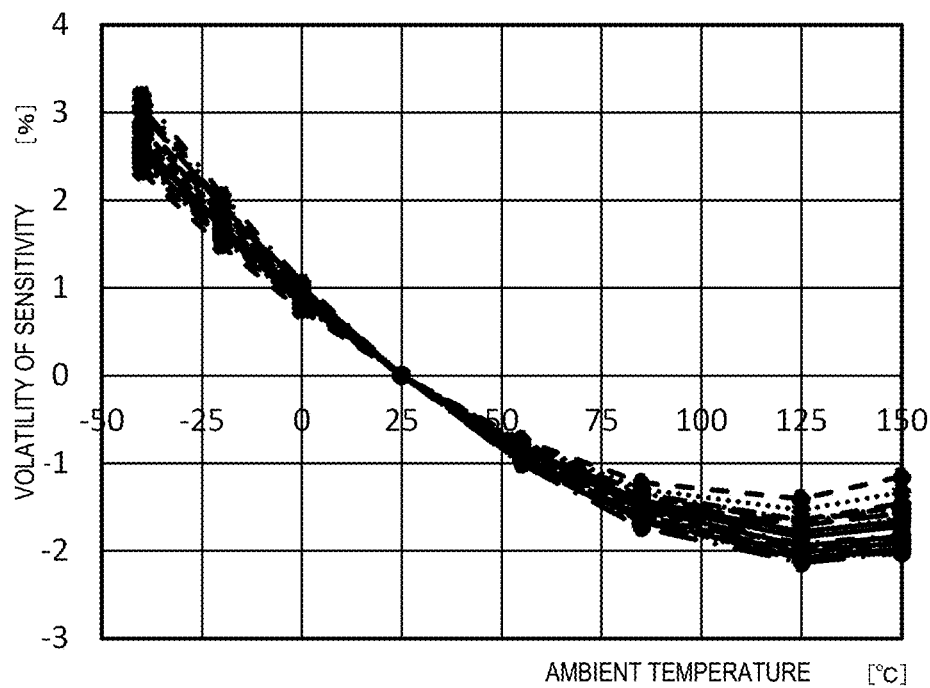
FIG. 6A is a graph illustrating the results of the measurement of temperature characteristics concerning the sensitivity of the sensor output.

FIG. 6A is a graph illustrating the results of the measurement of temperature characteristics concerning the sensitivity of the sensor output with respect to multiple pairs of TMR sensors 2. The horizontal axis of the graph represents the ambient temperature [° C.] of the TMR sensors 2, and the vertical axis represents the volatility [%] of the sensitivity at the ambient temperature, based on the sensitivity of the sensor output when the ambient temperature is, for example, about 25° C. Characteristic lines represent temperature coefficient sensitivity of the multiple pairs of TMR sensors 2.

As illustrated in the graph, the volatility of the sensitivity linearly increases positively as the temperature decreases in a temperature region in which the ambient temperature is lower than about 25° C. The volatility of the sensitivity nonlinearly increases negatively as the temperature increases in a temperature region in which the ambient temperature is higher than about 25° C.

Figure 6B:
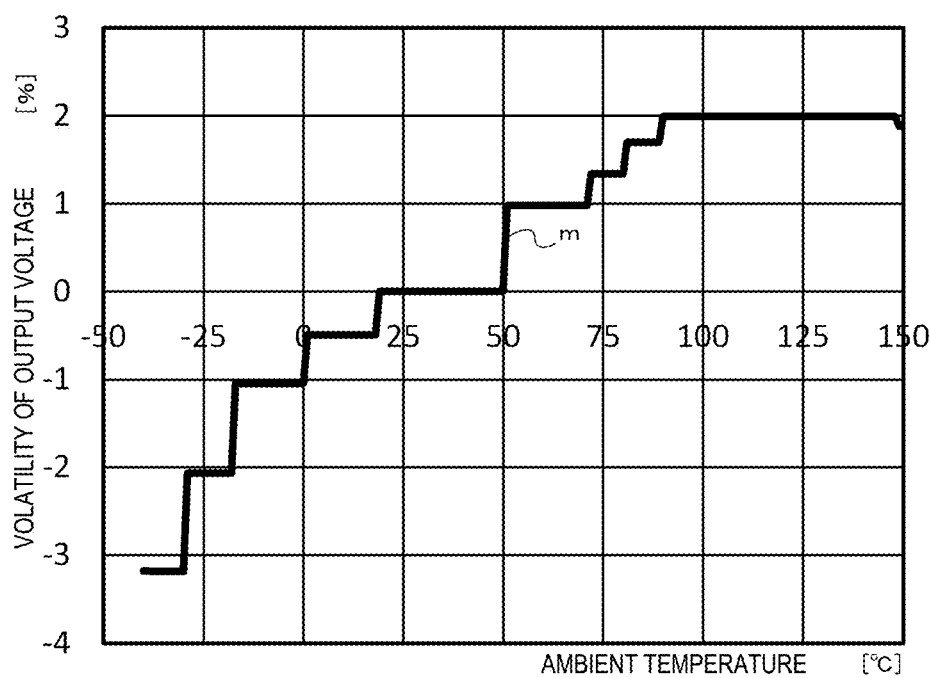
FIG. 6B is a graph illustrating a change in volatility of an output voltage that is outputted from the sensor output compensation circuit with respect to ambient temperature.

FIG. 6B is a graph illustrating a degree at which the output voltage VOUT of the sensor output compensation IC 1 varies with the amplification factor of the compensation amplifier circuit 4 being variable depending on the ambient temperature that causes the predetermined variation in the sensitivity, based on the temperature characteristics of the sensitivity illustrated in FIG. 6A. The horizontal axis of the graph represents the ambient temperature [° C.], and the vertical axis represents the volatility [%] of the output voltage VOUT. A characteristic line m represents a change in the volatility of the output voltage VOUT with respect to the ambient temperature.

From the characteristic line m, the volatility of the output voltage VOUT linearly decreases negatively in the left-hand direction as the ambient temperature decreases in a temperature region in which the ambient temperature is lower than about 25° C., and the volatility of the sensitivity that linearly increases in the left-hand direction and that is illustrated in FIG. 6A is canceled. The volatility of the output voltage VOUT nonlinearly increases positively in the right-hand direction as the ambient temperature increases in a temperature region in which the ambient temperature is higher than about 25° C., and the volatility of the sensitivity that nonlinearly decreases in the right-hand direction and that is illustrated in FIG. 6A is canceled.

Figure 7A:
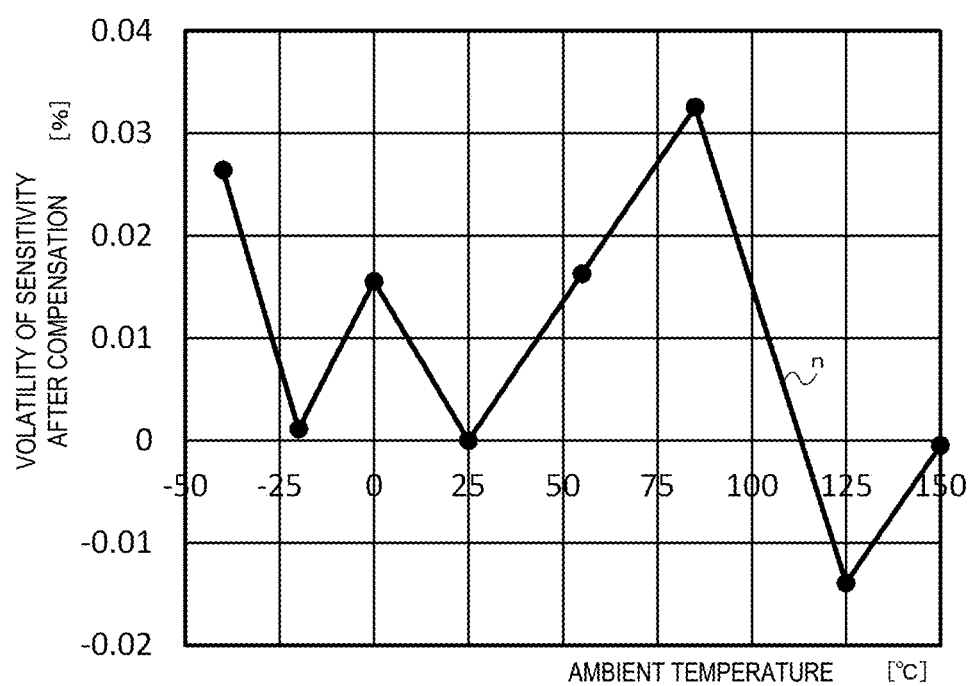
FIG. 7A is a graph illustrating the temperature characteristics concerning the sensitivity of the sensor output that is compensated by the temperature coefficient sensitivity compensation circuit.

FIG. 7A is a graph illustrating the temperature characteristics concerning the sensitivity of the sensor output that is adjusted by the temperature coefficient sensitivity compensation described above. The horizontal axis of the graph represents the ambient temperature [° C.] of the TMR sensors 2, and the vertical axis represents the volatility [%] of the sensitivity at the ambient temperature, based on the sensitivity of the sensor output when the ambient temperature is, for example, about 25° C. A characteristic line n represents the temperature coefficient sensitivity of the sensor output that is compensated with the volatility of the output voltage VOUT illustrated in FIG. 6B. As illustrated in the graph, the volatility of the sensitivity of the sensor output after compensation is within a small range of about +0.04 [%] to about −0.02 [%].

Figure 7B:
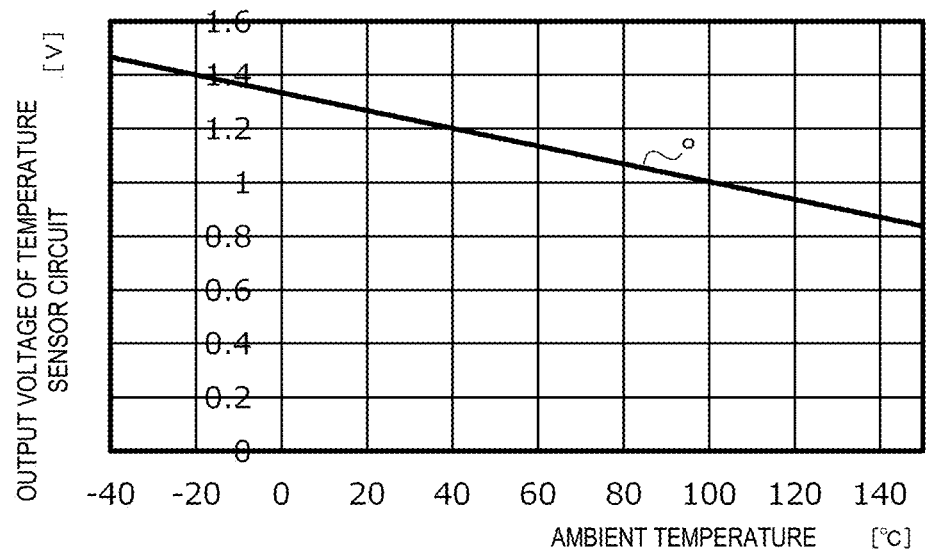
FIG. 7B is a graph illustrating the voltage characteristics of the ambient temperature that is used for temperature coefficient sensitivity compensation.

FIG. 7B is a graph illustrating the voltage characteristics of the ambient temperature that is used for the temperature coefficient sensitivity compensation described above. The horizontal axis of the graph represents the ambient temperature [° C.] of the sensor output compensation IC 1, and the vertical axis represents the output voltage [V] of the temperature sensor circuit 11 at the ambient temperature. A characteristic line o represents the temperature characteristics of the output voltage of the temperature sensor circuit 11.

As for the sensor output compensation IC 1 according to the present preferred embodiment as described above, the amplification factor of the compensation amplifier circuit 4 is made variable in a manner in which the connections between the multiple resistors that are connected to the compensation amplifier circuit 4 as the variable resistor R5 are switched under control of the multiple switches of the temperature coefficient sensitivity compensation circuit 6, and the combined resistance value of the multiple resistors is changed. The switching operation of the switches is performed when the ambient temperature that is detected by the temperature sensor circuit 11 as a voltage is compared with the predetermined multiple reference voltages VREF_T1, VREF_T2, VREF_T3, . . . , and VREF_Tn and becomes a voltage corresponding to the ambient temperature that causes a predetermined variation. The switching operation of the switches adjusts the amplification factor of the compensation amplifier circuit 4 to the amplification factor to cancel the predetermined variation that is caused by the ambient temperature in the sensitivity in the output of the differential amplifier circuit 3, and the temperature coefficient sensitivity of the sensor output is adjusted.

That is, as for the sensor output compensation IC 1 according to the present preferred embodiment, the variation in the sensitivity of the sensor output as the ambient temperature changes is compensated for in a manner in which the amplification factor of the compensation amplifier circuit 4 that compensates for the output of the differential amplifier circuit 3 is made variable into the amplification factor to cancel the variation by using the temperature coefficient sensitivity compensation circuit 6. Accordingly, unlike the existing temperature compensation circuit that is disclosed in Japanese Unexamined Patent Application Publication No. 11-194160 and that provides only temperature compensation depending on thermistor characteristics, a temperature range in which the temperature compensation can be provided is not limited, and the sensitivity temperature compensation of the sensitivity of the sensor output can be provided with respect to a wider range of an ambient temperature variation. In addition, temperature compensation characteristics do not vary due to a thermistor element unlike existing cases, and the precision of the sensitivity temperature compensation can be high. In addition, the sensor output compensation circuit can be provided without using a thermistor element as a temperature compensation circuit. Accordingly, the sensor output compensation circuit can be provided as an IC, and the size and cost of the sensor output compensation circuit can be reduced.

Figure 8:
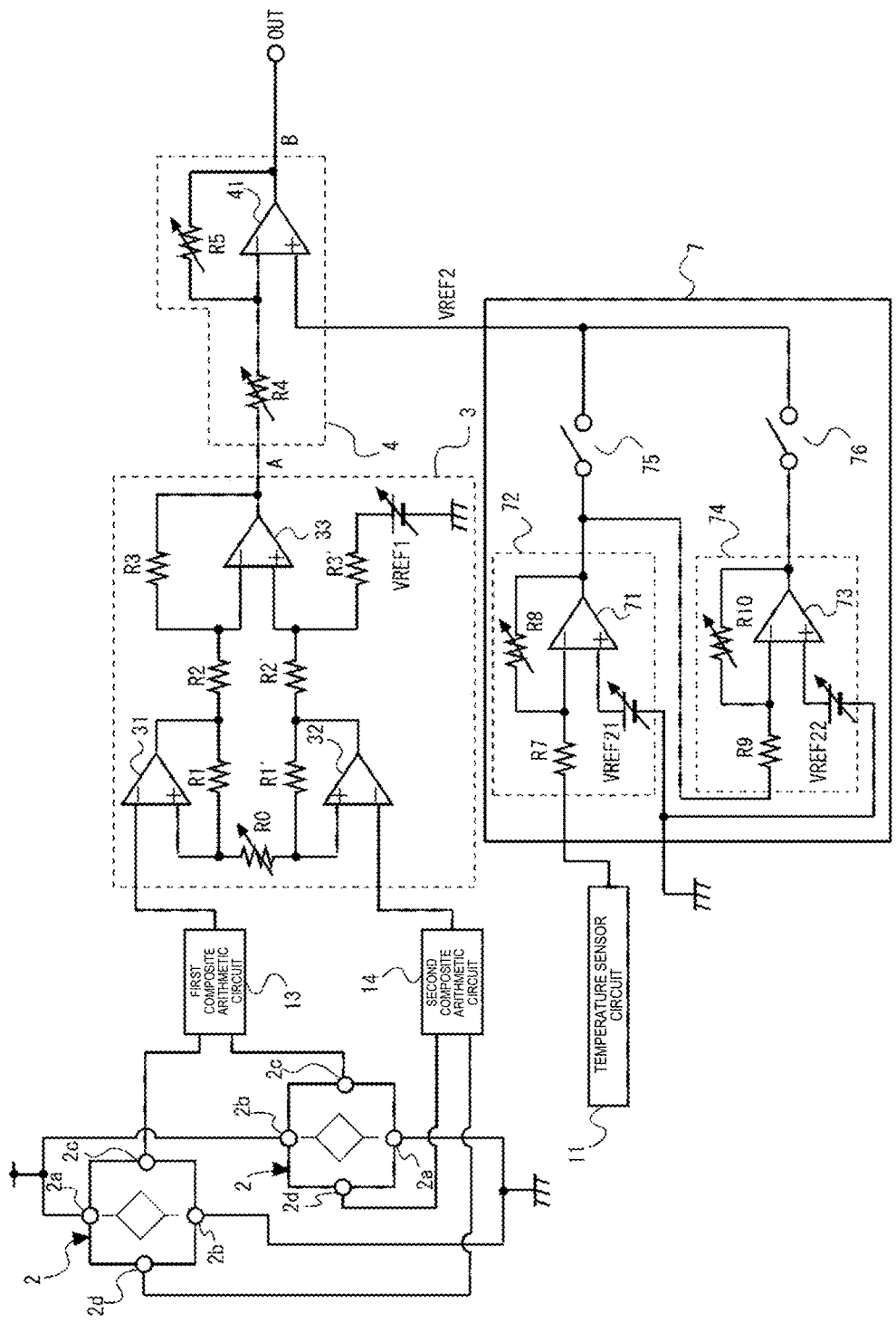
FIG. 8 is a circuit diagram for describing the function of a temperature-characteristic-of-offset compensation circuit in the sensor output compensation circuit illustrated in FIG. 1.

FIG. 8 is a circuit diagram for describing the function of the temperature-characteristic-of-offset compensation circuit 7 in the sensor output compensation IC 1 illustrated in FIG. 1. In FIG. 8, the same or corresponding components as those in FIG. 1 are designated by the same reference signs, and the description thereof is omitted.

The temperature-characteristic-of-offset compensation circuit 7 refers the ambient temperature that is detected by the temperature sensor circuit 11 and applies a reference voltage VREF2 to cancel the variation in the offset voltage of the sensor output as the ambient temperature changes to a reference voltage terminal of the compensation amplifier circuit 4.

Figure 9A:
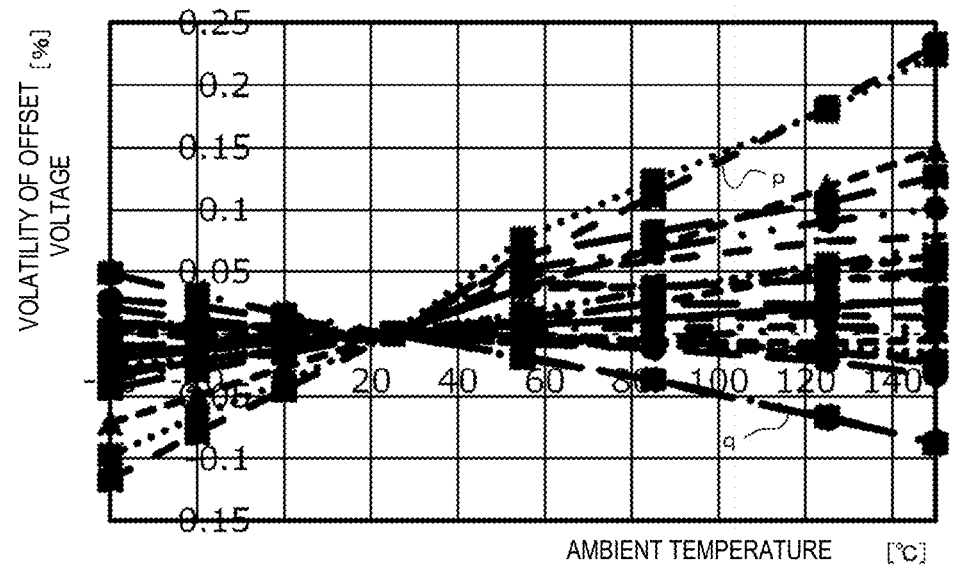
FIG. 9A is a graph illustrating the temperature characteristics of the volatility of an offset voltage.

The temperature variation in the offset voltage of the sensor output is illustrated in a graph illustrated in FIG. 9A. The horizontal axis of the graph represents the ambient temperature [° C.] of the sensor output compensation IC 1, and the vertical axis represents the volatility [%] of the offset voltage at the ambient temperature, based on the offset voltage when the ambient temperature is, for example, 25° C. Characteristic lines represent the temperature characteristics of offset voltages concerning the multiple pairs of TMR sensors 2. As illustrated in the graph, the temperature characteristics of the offset voltages linearly vary with linear slopes. The temperature-characteristic-of-offset compensation circuit 7 applies the reference voltage VREF2 to cancel the variation to the reference voltage terminal that is a non-inverting input terminal of the operational amplifier 41 in the compensation amplifier circuit 4.

According to the present preferred embodiment, the temperature-characteristic-of-offset compensation circuit 7 includes a first inverting amplifier circuit 72 that includes an operational amplifier 71, a second inverting amplifier circuit 74 that includes an operational amplifier 73, the first switch 75, and the second switch 76.

As for the first inverting amplifier circuit 72, a resistor R7 and a variable resistor R8 are connected to the operational amplifier 71, and a reference voltage VREF21 is applied to a non-inverting input terminal of the operational amplifier 71. The first inverting amplifier circuit 72 performs the inverting amplification of the ambient temperature that is detected by the temperature sensor circuit 11 as a voltage with an amplification factor (R8/R7) that corresponds to the volatility of the offset voltage. The volatility of the offset voltage corresponds to the slope of each characteristic line in the graph illustrated in FIG. 9A. The resistance value of the variable resistor R8 is adjusted, and consequently, the amplification factor (R8/R7) is matched with the volatility of the offset voltage.

As for the second inverting amplifier circuit 74, a resistor R9 and a variable resistor R10 are connected to the operational amplifier 73, and a reference voltage VREF22 is applied to a non-inverting input terminal of the operational amplifier 73. The second inverting amplifier circuit 74 performs the inverting amplification of the output of the first inverting amplifier circuit 72 with an amplification factor (R10/R9) and inverts the polarity thereof. The resistance value of the variable resistor R10 is adjusted, and consequently, the amplification factor (R10/R9) preferably is set to about 1, for example. When the variation in the offset voltage with respect to the ambient temperature increases as the ambient temperature increases, the close control of the second switch 76 is provided, and the output of the second inverting amplifier circuit 74 is inputted as the reference voltage VREF2 into the reference voltage terminal of the operational amplifier 41.

Accordingly, for example, in the case where the temperature characteristics of the offset voltage are represented by using a characteristic line p that linearly rises in the right-hand direction such that the variation with respect to the ambient temperature increases as the ambient temperature increases in the graph illustrated in FIG. 9A, a voltage that is outputted from the temperature sensor circuit 11 such that the voltage decreases as the ambient temperature increases and that is represented by a characteristic line that linearly falls in the right-hand direction is first converted into a voltage that has a slope the magnitude of which is equal or substantially equal to the magnitude of the volatility of the offset voltage of the characteristic line p and that has characteristics rising in the right-hand direction such that the polarity of the slope is inverted by using the first inverting amplifier circuit 72 in the temperature-characteristic-of-offset compensation circuit 7. The close operation of the second switch 76 is provided, and accordingly, the voltage is converted into the reference voltage VREF2 that has characteristics falling in the right-hand direction such that the polarity of the slope is inverted by using the second inverting amplifier circuit 74. For this reason, the compensation amplifier circuit 4 amplifies the output voltage including the offset voltage that is outputted from the differential amplifier circuit 3 and that is represented by using the characteristic line p that linearly rises in the right-hand direction, based on the reference voltage VREF2, and consequently, the variation in the offset voltage due to the temperature characteristics is canceled.

Figure 9B:
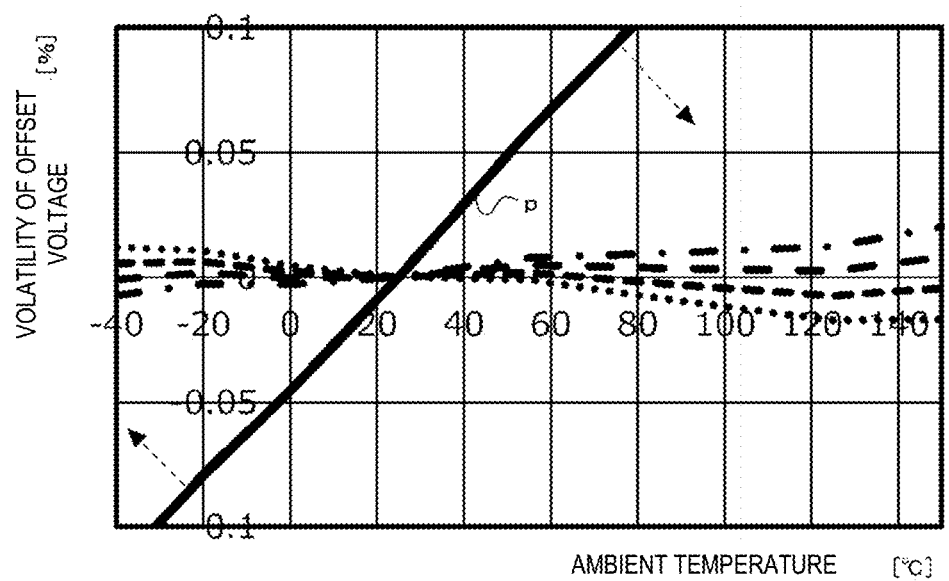
FIG. 9B is a graph illustrating the temperature characteristics of the volatility of the offset voltage that is compensated by the temperature-characteristic-of-offset compensation circuit.

FIG. 9B is a graph illustrating the temperature characteristics of offset voltages that are adjusted by the temperature-characteristic-of-offset compensation circuit 7 concerning four pairs of TMR sensors 2. The horizontal axis and the vertical axis of the graph are the same as those in FIG. 9A.

In the graph illustrated in FIG. 9B, the characteristic line p before adjustment is illustrated. As illustrated by using an arrow that is represented by using a dashed line, the slope is tilted downward by the offset compensation described above, and the temperature characteristics of the offset voltage concerning two TMR sensors 2 that have the characteristic line p are adjusted into temperature characteristics that have a substantially flat slope.

The close control of the first switch 75 is provided in the case where the variation in the offset voltage with respect to the ambient temperature decreases as the ambient temperature increases, and the output of the first inverting amplifier circuit 72 is inputted as the reference voltage VREF2 into the reference voltage terminal of the operational amplifier 41. Accordingly, for example, in the case where the temperature characteristics of the offset voltage of the two TMR sensors 2 are represented by using a characteristic line q that linearly falls in the right-hand direction such that the variation with respect to the ambient temperature decreases as the ambient temperature increases in the graph illustrated in FIG. 9A, a voltage that is outputted from the temperature sensor circuit 11 such that the voltage decreases as the ambient temperature increases and that is represented by a characteristic line that linearly falls in the right-hand direction is converted into the reference voltage VREF2 that has a slope the magnitude of which is equal or substantially equal to the magnitude of the volatility of the offset voltage of the characteristic line q and that has characteristics rising in the right-hand direction such that the polarity of the slope is inverted by using the first inverting amplifier circuit 72 in the temperature-characteristic-of-offset compensation circuit 7 because the close control of the first switch 75 is provided. For this reason, the compensation amplifier circuit 4 amplifies the output voltage including the offset voltage that is outputted from the differential amplifier circuit 3 and that is represented by using the characteristic line q that linearly falls in the right-hand direction, based on the reference voltage VREF2, and consequently, the variation in the offset voltage due to the temperature characteristics is canceled as in the graph illustrated FIG. 9B.

As for the sensor output compensation IC 1 according to the present preferred embodiment as described above, in the case where the variation in the offset voltage with respect to the ambient temperature increases as the ambient temperature increases, the output of the second inverting amplifier circuit 74 is inputted into the reference voltage terminal of the compensation amplifier circuit 4 by using the second switch 76. Accordingly, the first inverting amplifier circuit 72 performs the inverting amplification of the ambient temperature that is detected by the temperature sensor circuit 11 as a voltage with the amplification factor (R8/R7) that corresponds to the volatility of the offset voltage, the second inverting amplifier circuit 74 inverts the polarity, an ambient temperature inverting signal that decreases with the volatility of the offset voltage as the ambient temperature increases is inputted as the reference voltage VREF2 into the reference voltage terminal of the operational amplifier 41 from the second inverting amplifier circuit 74. For this reason, the compensation amplifier circuit 4 amplifies the output of the differential amplifier circuit 3, based on the ambient temperature inverting signal, and consequently, the sensor output in which the temperature variation in the offset voltage is canceled is obtained from the compensation amplifier circuit 4.

In the case where the variation in the offset voltage with respect to the ambient temperature decreases as the ambient temperature increases, the output of the first inverting amplifier circuit 72 is inputted into the reference voltage terminal of the operational amplifier 41 by using the first switch 75. Accordingly, the ambient temperature inverting signal that increases with the volatility of the offset voltage as the ambient temperature increases, which is obtained by inverting amplification performed by the first inverting amplifier circuit 72 with the amplification factor (R8/R7) that corresponds to the volatility of the offset voltage, is inputted as the reference voltage VREF2 into the reference voltage terminal of the operational amplifier 41 from the first inverting amplifier circuit 72. For this reason, the compensation amplifier circuit 4 amplifies the output of the differential amplifier circuit 3, based on the ambient temperature inverting signal, and consequently, the sensor output in which the variation in the offset voltage as the ambient temperature changes is canceled is obtained from the compensation amplifier circuit 4.

That is, as for the sensor output compensation IC 1 according to the present preferred embodiment, the variation in the offset voltage of the sensor output as the ambient temperature changes is canceled in a manner in which the compensation amplifier circuit 4 that compensates the output of the differential amplifier circuit 3 amplifies the output of the differential amplifier circuit 3, based on the reference voltage VREF2 that is applied to the reference voltage terminal of the operational amplifier 41 from the temperature-characteristic-of-offset compensation circuit 7. Accordingly, a single compensation operation enables the offset voltage to be easily adjusted with precision. For this reason, the temperature compensation of the offset voltage of the sensor output can be easily and accurately provided, unlike the existing offset adjustment circuit that is disclosed in Japanese Unexamined Patent Application Publication No. 11-194160 and that adjusts the offset of the sensor output merely by adjusting the midpoint potential of the output of the differential amplifier circuit by using the variable resistor.

As for the sensor output compensation IC 1 according to the present preferred embodiment, the circuits that are included in the sensor output compensation circuit are mounted in the same IC. Accordingly, variations caused by differences in mounting components that are included in the circuits and wiring lines between the circuits that are included in the sensor output compensation circuit are reduced. For this reason, the sensor output compensation IC 1 provides the adjustment of the sensor output with precision. In addition, the IC can fulfill all compensation functions. The compensation can be provided with precision for every pair of the TMR sensors 2 with a relatively simple circuit structure in a manner in which the sensor output of the two TMR sensors 2 that is adjusted is monitored. As for the adjustment of the compensation of the compensation circuits, the selection of setting data to be written on the EEPROM 12 enables a compensation value to be easily selected.

The temperature sensor circuit 11 is mounted in the same IC as the other circuits that are included in the sensor output compensation circuit, and consequently, the relative position of the temperature sensor circuit 11 with respect to the other circuits is always constant. For this reason, differences between the ambient temperature that is detected by the temperature sensor circuit 11 and the ambient temperatures of the other circuits are small. In the case where the temperature sensor circuit 11 is provided in another IC that differs from an IC in which the other circuits are provided, a parasitic resistance component of a wiring joint that connects the temperature sensor circuit 11 and the IC by using wire bonding, for example, eliminates a difference between the ambient temperature that is detected by the temperature sensor circuit 11 and an ambient temperature that is used for the IC. As a result, the sensor output compensation IC 1 according to the present preferred embodiment can provide the temperature adjustment of the sensor sensitivity and the offset voltage with precision.

As for the sensor output compensation IC 1 according to the present preferred embodiment, the influence of the residual magnetic field in the TMR sensors 2 is canceled without improving the sensors themselves in a manner in which the two TMR sensors 2 are disposed at the relative positions between which the influence of the residual magnetic field is canceled out as illustrated in FIG. 10, and the reference voltage circuit 10 applies the bias voltage Vbias to the two power terminals 2a and 2b of the TMR sensors 2 in opposite directions. The sensor output depending on the magnetic field that is detected by the two TMR sensors 2 is outputted based on the predetermined detection voltages that are measured in the detection signal output terminals 2c and 2d of the two TMR sensors 2, that is, the detection voltages that are measured in the detection signal output terminals 2c of the TMR sensors 2 and the detection voltages that are measured in the detection signal output terminals 2d of the TMR sensors 2 and is amplified by the differential amplifier circuit 3. For this reason, the influence of the residual magnetic field in the TMR sensors 2 is removed from the sensor output, the hysteresis can be reduced, and the sensor output compensation IC 1 can accurately detect the magnetic field.

As for the sensor output compensation IC 1 according to the present preferred embodiment, the sensor output is outputted as the differential voltage between the voltage that is obtained by adding or averaging the detection voltages that are measured in the detection signal output terminals 2c of the two TMR sensors 2 in a phase and that is outputted from the first composite arithmetic circuit 13 and the voltage that is obtained by adding or averaging the detection voltages that are measured in the detection signal output terminals 2d of the two TMR sensors 2 in another phase and that is outputted from the second composite arithmetic circuit 14 and is amplified by the differential amplifier circuit 3. For this reason, the sensor output is obtained from the differential voltage between the outputs of the two TMR sensors 2, and accordingly, the sensor output in which variations due to the TMR sensors 2 are averaged can be obtained, a circuit structure that can compensate for the variations due to the TMR sensors 2 is obtained, and the magnetic field can be more accurately detected.

A secondary advantageous effect is that the use of the multiple TMR sensors 2 enables malfunctions of the TMR sensors 2 to be easily determined. When the TMR sensors 2 malfunction, the TMR sensors 2 do not operate in proportion to an external magnetic field, and the two TMR sensors 2 always output the sensor output having a constant voltage value as the external magnetic field changes. The detection of this state enables whether the TMR sensors 2 malfunction to be determined.

Figure 11:
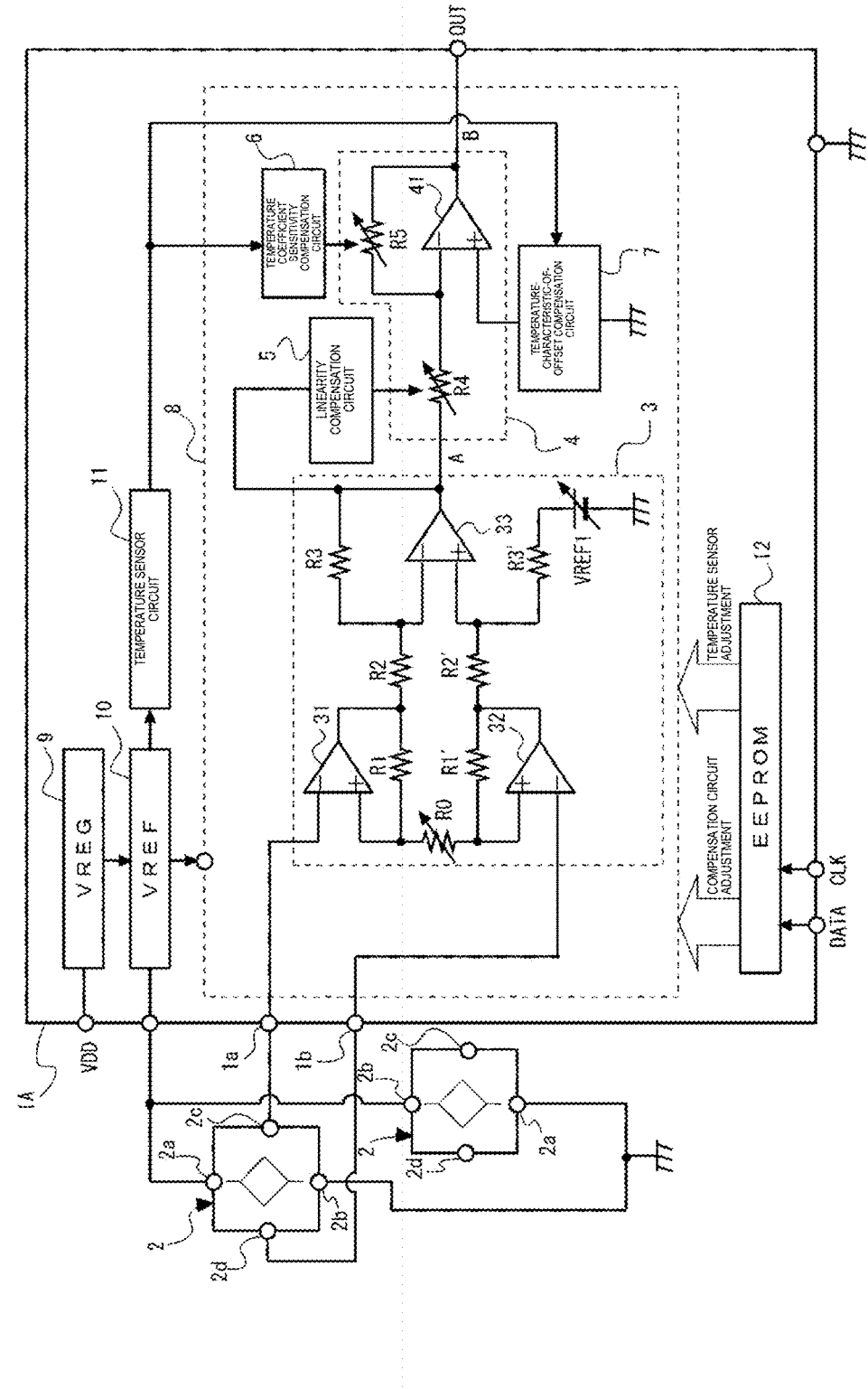
FIG. 11 is a circuit diagram illustrating a configuration an entire sensor output compensation circuit according to a second preferred embodiment of the present invention.

FIG. 11 is a circuit diagram illustrating a configuration of an entire sensor output compensation IC 1A that is included in a sensor output compensation circuit according to a second preferred embodiment of the present invention. In FIG. 11, the same or corresponding components as those in FIG. 1 are designated by the same reference signs, and the description thereof is omitted.

The sensor output compensation IC 1A according to the second preferred embodiment differs from the sensor output compensation IC 1 according to the first preferred embodiment in that the detection voltages that are measured in the detection signal output terminals 2c and 2d of one of the two TMR sensors 2 are used and in that the first composite arithmetic circuit 13 and the second composite arithmetic circuit 14 are not included.

That is, as for the sensor output compensation IC 1A according to the second preferred embodiment, the differential amplifier circuit 3 directly applies the detection voltages that are measured in the two detection signal output terminals 2c and 2d of the one of the TMR sensors 2 to the inverting input terminals of the operational amplifiers 31 and 32 via the input terminals 1a and 1b for amplification and performs the differential amplification of the amplified detection voltages by using the operational amplifier 33. That is, the differential amplifier circuit 3 amplifies, as the sensor output, a differential voltage between the detection voltages that are measured in the detection signal output terminals 2c and 2d of the one of the two TMR sensors 2.

A load, not illustrated, having the same or substantially the same level as the level of input impedance that is measured between the input terminal 1a and 1b is connected between the detection signal output terminals 2c and 2d of the other TMR sensor 2 that are not used, and load balance is maintained between the other TMR sensor 2 and the one of the TMR sensors 2 that is used. The TMR sensor 2 that is used may be any one of the two TMR sensors 2.

Also, as for the sensor output compensation IC 1A according to the second preferred embodiment, the influence of the residual magnetic field in the TMR sensors 2 is canceled without improving the sensors themselves in a manner in which the two TMR sensors 2 are disposed at the relative positions between which the influence of the residual magnetic field is canceled out as illustrated in FIG. 10, and the reference voltage circuit 10 applies the bias voltage Vbias to the two power terminals 2a and 2b of the TMR sensors 2 in opposite directions. The sensor output depending on the magnetic field that is detected by the two TMR sensors 2 is outputted based on the predetermined detection voltages that are measured in the detection signal output terminals 2c and 2d of the two TMR sensors 2, that is, the detection voltages that are measured in the detection signal output terminals 2c and 2d of one of the TMR sensors 2 and is amplified by the differential amplifier circuit 3. For this reason, as for the sensor output compensation IC 1A according to the second preferred embodiment, the structure of the sensor output compensation IC 1A is simplified, a circuit area is reduced, costs are reduced, the influence of the residual magnetic field in the two TMR sensors 2 is removed from the sensor output, and the magnetic field can be accurately detected.

Figure 12:
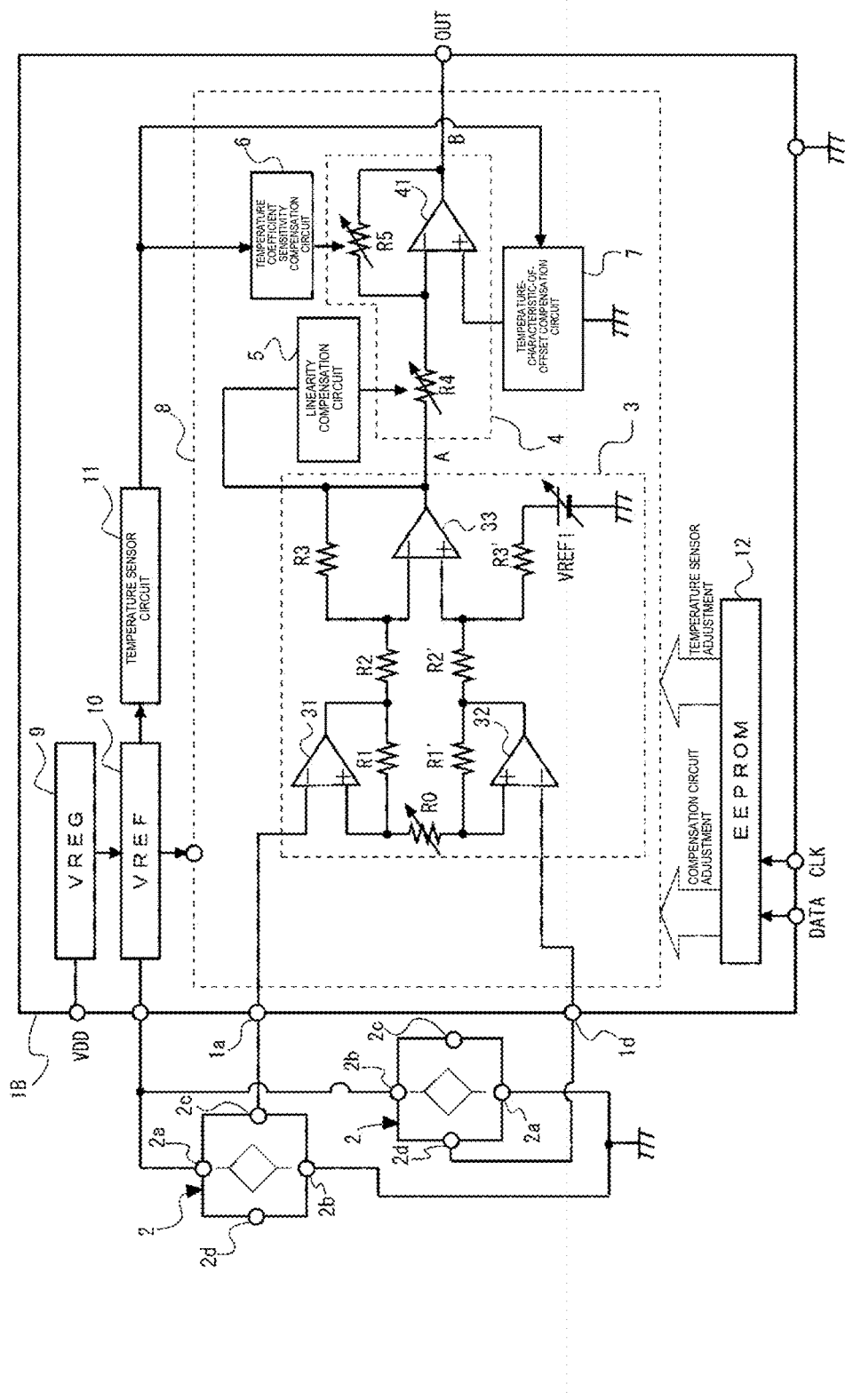
FIG. 12 is a circuit diagram illustrating a configuration of an entire sensor output compensation circuit according to a third preferred embodiment of the present invention.

FIG. 12 is a circuit diagram illustrating a configuration of an entirety of a sensor output compensation IC 1B that is included in a sensor output compensation circuit according to a third preferred embodiment of the present invention. In the figure, the same or corresponding components as those in FIG. 1 are designated by the same reference signs, and the description thereof is omitted.

The sensor output compensation IC 1B according to the third preferred embodiment differs from the sensor output compensation IC 1 according to the first preferred embodiment in that the detection voltage that is measured in the detection signal output terminal 2c of the one of the two TMR sensors 2 and the detection voltage that is measured in the detection signal output terminal 2d of the other TMR sensor 2 of the two TMR sensors 2 are used and in that the first composite arithmetic circuit 13 and the second composite arithmetic circuit 14 are not included.

That is, as for the sensor output compensation IC 1B according to the third preferred embodiment, the differential amplifier circuit 3 directly applies the detection voltage that is measured in the detection signal output terminal 2c of one of the TMR sensors 2 to the inverting input terminal of the operational amplifier 31 via the input terminal 1a for amplification. The detection voltage that is measured in the detection signal output terminal 2d of the other TMR sensor 2 is directly applied to the inverting input terminal of the operational amplifier 32 via the input terminal 1d for amplification. The operational amplifier 33 performs the differential amplification of the amplified detection voltages. That is, the differential amplifier circuit 3 amplifies, as the sensor output, a differential voltage between the detection voltage that is measured in the detection signal output terminal 2c of the one of the TMR sensors 2 in a phase and the detection voltage that is measured in the detection signal output terminal 2d of the other TMR sensor 2 in another phase.

A load, not illustrated, is connected to the detection signal output terminals 2d and 2c of the TMR sensors 2 that are not used such that load balance is maintained between the TMR sensors 2.

Also, as for the sensor output compensation IC 1B according to the third preferred embodiment, the influence of the residual magnetic field in the TMR sensors 2 is canceled without improving the sensors themselves in a manner in which the two TMR sensors 2 are disposed at the relative positions between which the influence of the residual magnetic field is canceled out as illustrated in FIG. 10, and the reference voltage circuit 10 applies the bias voltage Vbias to the two power terminals 2a and 2b of the TMR sensors 2 in opposite directions. The sensor output is outputted as the differential voltage between the detection voltage that is measured in the detection signal output terminal 2c of the one of the TMR sensors 2 in a phase and the detection voltage that is measured in the detection signal output terminal 2d of the other TMR sensor 2 in another phase and is amplified by the differential amplifier circuit 3.

For this reason, as for the sensor output compensation IC 1B according to the third preferred embodiment, the structure of the sensor output compensation IC 1B is simplified, an circuit area is reduced, costs are reduced, the influence of the residual magnetic field in the TMR sensors 2 is removed from the sensor output, and the magnetic field can be accurately detected as in the sensor output compensation IC 1A according to the second preferred embodiment. As for the sensor output compensation IC 1B according to the third preferred embodiment, the sensor output is obtained from the differential voltage between the outputs of the two TMR sensors 2, and accordingly, the sensor output in which the variations due to the TMR sensors 2 is averaged can be obtained, a circuit structure that can compensate for the variations due to the TMR sensors 2 is obtained, and the magnetic field can be more accurately detected as in the sensor output compensation IC 1 according to the first preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensor output compensation circuit comprising:
   a differential amplifier circuit to amplify a sensor output outputted based on a predetermined detection voltage measured in detection signal output terminals of two sensors including respective sensor elements with a resistance value that changes depending on a detected physical quantity and that are connected by a bridge connection, the two sensors being located at relative positions between which an influence of a residual magnetic field is canceled out, the sensor output depending on the physical quantity detected by the sensors; and
   a bias circuit to apply a voltage to two power terminals of one of the two sensors in a direction opposite to a direction in which a voltage is applied to two power terminals of another of the two sensors; wherein
   the differential amplifier circuit includes an instrumentation amplifier and a compensation amplifier circuit to adjust an output of the differential amplifier circuit.

2. A sensor output compensation circuit comprising:
   a differential amplifier circuit to amplify a sensor output outputted based on a predetermined detection voltage measured in detection signal output terminals of two sensors including respective sensor elements with a resistance value that changes depending on a detected physical quantity and that are connected by a bridge connection, the two sensors being located at relative positions between which an influence of a residual magnetic field is canceled out, the sensor output depending on the physical quantity detected by the sensors;
   a bias circuit to apply a voltage to two power terminals of one of the two sensors in a direction opposite to a direction in which a voltage is applied to two power terminals of another of the two sensors;
   a first composite arithmetic circuit to add or average detection voltages measured in the detection signal output terminals of one of the two sensors in a phase; and
   a second composite arithmetic circuit to add or average detection voltages measured in the detection signal output terminals of another of the two sensors in another phase; wherein
   the differential amplifier circuit is configured to amplify, as the sensor output, a differential voltage between an output of the first composite arithmetic circuit and an output of the second composite arithmetic circuit.

3. The sensor output compensation circuit according to claim 1, wherein the differential amplifier circuit is configured to amplify, as the sensor output, a differential voltage between detection voltages measured in the detection signal output terminals of one of the two sensors.

4. The sensor output compensation circuit according to claim 1, wherein the differential amplifier circuit is configured to amplify, as the sensor output, a differential voltage between a detection voltage measured in one of the detection signal output terminals of one of the two sensors in a phase and a detection voltage measured in another of the detection signal output terminals of another of the two sensors in another phase.

5. The sensor output compensation circuit according to claim 1, wherein the sensor elements are Tunneling Magneto-Resistive elements.

6. The sensor output compensation circuit according to claim 2, wherein the first composite arithmetic circuit includes an adder circuit including resistors connected to an operational amplifier.

7. The sensor output compensation circuit according to claim 2, wherein the second composite arithmetic circuit includes an adder circuit including resistors connected to an operational amplifier.

8. The sensor output compensation circuit according to claim 2, wherein the first composite arithmetic circuit includes an averaging circuit including resistors connected to an operational amplifier.

9. The sensor output compensation circuit according to claim 1, wherein the compensation amplifier circuit includes an operational amplifier and variable resistors connected to the compensation amplifier circuit.

10. The sensor output compensation circuit according to claim 1, further comprising:
    a linearity compensation circuit to adjust linearity of the sensor output;
    a temperature coefficient sensitivity compensation circuit to adjust temperature coefficient sensitivity of the sensor output; and
    a temperature-characteristic-of-offset compensation circuit to adjust temperature characteristics of an offset voltage of the sensor output.

11. The sensor output compensation circuit according to claim 1, further comprising:
    a regulator circuit;
    a reference voltage circuit; and
    a temperature sensor circuit.

12. A sensor output compensation comprising:
    a differential amplifier circuit to amplify a sensor output outputted based on a predetermined detection voltage measured in detection signal output terminals of two sensors including respective sensor elements with a resistance value that changes depending on a detected physical quantity and that are connected by a bridge connection, the two sensors being located at relative positions between which an influence of a residual magnetic field is canceled out, the sensor output depending on the physical quantity detected by the sensors;
    a bias circuit to apply a voltage to two power terminals of one of the two sensors in a direction opposite to a direction in which a voltage is applied to two power terminals of another of the two sensors; and
    an EEPROM to enable a user to rewrite a stored content.

13. The sensor output compensation circuit according to claim 12, wherein the differential amplifier circuit is configured to amplify, as the sensor output, a differential voltage between detection voltages measured in the detection signal output terminals of one of the two sensors.

14. The sensor output compensation circuit according to claim 12, wherein the differential amplifier circuit is configured to amplify, as the sensor output, a differential voltage between a detection voltage measured in one of the detection signal output terminals of one of the two sensors in a phase and a detection voltage measured in another of the detection signal output terminals of another of the two sensors in another phase.

15. The sensor output compensation circuit according to claim 12, wherein the sensor elements are Tunneling Magneto-Resistive elements.

16. The sensor output compensation circuit according to claim 12, further comprising:

a linearity compensation circuit to adjust linearity of the sensor output;
a temperature coefficient sensitivity compensation circuit to adjust temperature coefficient sensitivity of the sensor output; and
a temperature-characteristic-of-offset compensation circuit to adjust temperature characteristics of an offset voltage of the sensor output.

17. The sensor output compensation circuit according to claim 12, further comprising:
a regulator circuit;
a reference voltage circuit; and
a temperature sensor circuit.

* * * * *